(12) United States Patent
Girolamo et al.

(10) Patent No.: US 11,555,482 B2
(45) Date of Patent: Jan. 17, 2023

(54) STEPPED CONDUCTIVITY INTERFACE (71) Applicant: Siemens Gamesa Renewable Energy A/S, Brande (DK)

(72) Inventors: Donato Girolamo, Molinara (IT); Yannick Cao Van Truong, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 448 days.

(21) Appl. No.: 16/437,034

(22) Filed: Jun. 11, 2019

(65) Prior Publication Data
US 2019/0383274 A1 Dec. 19, 2019

(30) Foreign Application Priority Data
Jun. 14, 2018 (EP) ...................... 8177846

(51) Int. Cl.
*F03D 80/30* (2016.01)
*F03D 1/06* (2006.01)
*B32B 37/00* (2006.01)

(52) U.S. Cl.
CPC .............. *F03D 80/30* (2016.05); *B32B 37/00* (2013.01); *F03D 1/0675* (2013.01); *B32B 2307/202* (2013.01)

(58) Field of Classification Search
CPC .......... F03D 80/30; B64D 45/02; H02G 13/80
See application file for complete search history.

(56) References Cited

U.S. PATENT DOCUMENTS 5,863,667 A * 1/1999 Poggi ........................ H05F 3/00
428/608
7,651,320 B2 1/2010 Hansen
(Continued)

FOREIGN PATENT DOCUMENTS

CN 101477857 A 7/2009
CN 103925169 A 7/2014
(Continued)

OTHER PUBLICATIONS

Extended European Search report dated Dec. 13, 2018 for Application No. 18177846.5.
(Continued)

*Primary Examiner* — Woody A Lee, Jr.
*Assistant Examiner* — Wesley Le Fisher
(74) *Attorney, Agent, or Firm* — Schmeiser, Olsen & Watts LLP (57) ABSTRACT

Provided is a stepped conductivity arrangement between a carbon-based element and a down conductor of a wind turbine rotor blade, which stepped conductivity arrangement includes a transition interface arranged to electrically connect a first electrically conductive part and a second electrically conductive part, wherein the first electrically conductive part extends from the down conductor, the second electrically conductive part extends from the carbon-based element, and wherein the electrical conductivity of the transition interface decreases in the direction of the second electrically conductive part. The embodiments further describe a wind turbine rotor blade comprising such a stepped conductivity arrangement and a method of providing such a stepped conductivity arrangement.

15 Claims, 6 Drawing Sheets (56) References Cited

U.S. PATENT DOCUMENTS

| | | | |
|---|---|---|---|
| 10,648,456 B2* | 5/2020 | Shain | F03D 80/40 |
| 2006/0280613 A1* | 12/2006 | Hansen | H02G 13/80 |
| | | | 416/230 |
| 2007/0074892 A1 | 4/2007 | Hibbard | |
| 2008/0073098 A1 | 3/2008 | Llorente Gonzalez et al. | |
| 2012/0134826 A1 | 5/2012 | Arocena De La Rua et al. | |
| 2013/0048331 A1* | 2/2013 | Fornes | C09D 5/24 |
| | | | 174/2 |
| 2014/0199170 A1 | 7/2014 | Madsen et al. | |
| 2015/0292479 A1 | 10/2015 | Ohlerich et al. | |
| 2016/0327028 A1 | 11/2016 | March Nomen et al. | |
| 2018/0029317 A1* | 2/2018 | Tsotsis | B32B 5/022 |

FOREIGN PATENT DOCUMENTS

| | | | |
|---|---|---|---|
| EP | 2458207 A2 | 5/2012 | |
| EP | 2930010 A1 | 10/2015 | |
| EP | 2930355 A1 | 10/2015 | |
| EP | 3184814 A1 | 6/2017 | |
| WO | WO2005026538 A1 | 3/2005 | |
| WO | WO 2018095649 A1 | 5/2018 | |

OTHER PUBLICATIONS

Chinese Office Action dated Jun. 3, 2021 for Application No. 201910515166.X.

* cited by examiner

STEPPED CONDUCTIVITY INTERFACE

CROSS-REFERENCE TO RELATED APPLICATION

This application claims priority to European Application No. 18177846.5, having a filing date of Jun. 14, 2018, the entire contents of which are hereby incorporated by reference.

FIELD OF TECHNOLOGY

The following describes a stepped conductivity interface, a wind turbine rotor blade comprising such a stepped conductivity interface; and a method of providing such a stepped conductivity interface.

BACKGROUND

A rotor blade of a wind turbine is at most risk of receiving a lightning strike on account of its exposed position. Therefore, it is critical that the lightning protection system (LPS) of a wind turbine is properly designed to protect the rotor blades from lightning damage. This is usually done by arranging a high-voltage metal cable as a down conductor in the blade interior and connecting it to the grounding system of the LPS. Receptors at various points along the outside of a rotor blade are connected to the internal down conductor, providing a safe current path to ground when lightning strikes the rotor blade.

A problem with this type of LPS arises when the rotor blade is designed to incorporate weakly conducting elements, for example one or more carbon-based structural or functional parts comprising carbon fibre (referred to more simply as "carbon elements" in the following). Carbon elements may be used for various purposes, for example as load-bearing elements, heating mats, de-icing mats, etc. However, in the event of a lightning strike to a rotor blade, the impedance of its down conductor, the magnitude of the lightning current and the frequency components of the lightning current combine to generate a potential drop along the down conductor that can be in the order of millions of volts. Such a large potential difference can result in a flash-over between the down conductor and any carbon element in the vicinity. Furthermore, mutual induction between a down conductor and a neighbouring carbon element may give rise to electric currents in the carbon element. Either of these effects may cause significant structural damage to the carbon element and to any other material in the flashover path. A damaged load-bearing carbon element can lead to structural damage in the blade. A damaged carbon element of a sub-system such as a de-icing system or a heating system can result in malfunction or failure of that sub-system. Initially, damage to carbon element(s) may go unnoticed, but the damage may become worse under cyclic loading of the rotor blade, and may ultimately result in catastrophic failure of the blade well within before the end of its expected lifetime.

Therefore, even though the conductivity of carbon is much lower than that of a metal down conductor, this property must be taken into consideration for the rotor blade LPS.

In one approach, the rotor blade LPS can be electrically coupled to any carbon elements using electrical connectors that deliberately allow part of the electrical current from a lightning strike to flow in a controlled manner through the carbon elements. However, it is difficult to achieve a satisfactory electrical connection between the metal down conductor and the carbon elements because of the very different electrical conductivities of the two materials. This difference manifests as a discontinuity or "sudden drop" in electrical conductivity at the junction between the metal down conductor and the weakly conducting carbon element. Arcing may result when a large electric current is faced with such a conductivity discontinuity. Arcing can result in melting or scorching of material in the vicinity. Following such an event, the blade structure may suffer from voids, bonding damage, delaminations, expansion, cracks, etc. These types of damage can propagate and become worse under cyclic loading of the rotor blade, so that catastrophic failure may ultimately ensue.

SUMMARY

An aspect relates to an improved interface between a weakly conducting carbon element and a down conductor of a rotor blade LPS.

According to embodiments of the invention, the stepped conductivity interface is arranged between a carbon element of a wind turbine rotor blade and a lightning protection system of the rotor blade. The inventive stepped conductivity interface comprises a plurality of electrically conductive interface regions arranged between a first electrically conductive part and a second electrically conductive part, wherein the first electrically conductive part extends from the lightning protection system and the second electrically conductive part extends from the carbon element. In the inventive stepped conductivity interface, the interface regions have different electrical conductivities, and the electrical conductivities of the interface regions decrease in the direction of the second electrically conductive part.

An advantage of the stepped conductivity interface according to embodiments of the invention is that it avoids an unfavourable sudden decrease in conductivity between an element of the LPS and a carbon element of the rotor blade. A very high electrical current arising in the event of a lightning strike will no longer "see" a barrier presented by a weakly conducting carbon element with its very low conductivity. Instead, the conductivity in the stepped conductivity interface is greater than the low conductivity of the carbon element, and the gradual decrease towards that low conductivity (instead of a sudden drop) will significantly reduce the likelihood of arcing.

According to embodiments of the invention, the wind turbine rotor blade comprises a number of structural and/or functional carbon-based elements incorporated in the rotor blade; a down conductor of a lightning protection system; and an embodiment of such a stepped conductivity arrangement between the down conductor and a carbon element.

The inventive wind turbine rotor blade is favourably protected from damage arising from arcing between the electrically conductive parts that join the down conductor and the embedded carbon element(s), so that the lifetime of the rotor blade is not compromised by the inclusion of carbon elements in the rotor blade.

According to embodiments of the invention, the method of providing a stepped conductivity interface between a carbon element of a wind turbine rotor blade and a lightning protection system of the rotor blade comprises the steps of providing a first electrically conductive part extending from the lightning protection system; providing a second electrically conductive part extending from the carbon element; and forming a plurality of electrically conductive interface regions with different electrical conductivities between the first and second electrically conductive parts, whereby the interface regions are arranged in order of decreasing conductivity in the direction of the second electrically conductive part.

Particularly advantageous embodiments and features of the invention are given by the dependent claims, as revealed in the following description. Features of different claim categories may be combined as appropriate to give further embodiments not described herein.

In the following, without restricting embodiments of the invention in any way, it may be assumed that the first electrically conductive part is a metal cable that is electrically connected in some way to a down conductor arranged inside the rotor blade. Similarly, without restricting embodiments of the invention in any way, it may be assumed that the second electrically conductive part is a conductive mat or "carbon mat"—primarily comprising carbon fibres—and bonded in an electrically conductive manner to a carbon element of the rotor blade. A carbon element of the rotor blade can be a load-carrying structural element such as a beam that extends over much of the rotor blade length. Equally, a carbon element of the rotor blade can be a functional element such as a heating mat, a de-icing mat, etc. A rotor blade can comprise any number of such carbon elements, and any such carbon element may be electrically connected in some suitable manner to the rotor blade LPS, for example using a metal cable as explained above.

The second electrically conductive part is an extension of the carbon element, and may be realized as a weakly conducting carbon mat. The terms "second electrically conductive part", "conductive mat" and "carbon mat" may be used interchangeably. The carbon mat may be assumed to have a similarly low conductivity as the carbon element. In the following, without restricting embodiments of the invention in any way, it may be assumed that the electrical conductivity of the second electrically conductive part is significantly lower then the electrical conductivity of the first electrically conductive part. For example, the electrical conductivity of a carbon mat may be in the region of 5 S/m to 3E4 S/m, depending on various factors such as the thickness of the carbon fibres and the fibre density. For a mat/ply system, the electrical conductivity can depend on area weight, fibre arrangement (uni-directional, bi-directional etc.) and the infusion method used. Furthermore, the electrical conductivity of a carbon fibre composite is an orthotropic property, not an isotropic property, since it is different in different directions. The electrical conductivity of a metal cable may be in the region of 1E6 to 1E8 S/m, depending on its cross-sectional area and the metal(s) of which it is made.

The metal cable and the conductive mat may be attached to each other in any suitable manner, for example by bonding an end section of the metal cable along an outer edge of the carbon mat, so that the metal cable is joined to the conductive mat in an overlap region. Therefore, in preferred embodiments of the invention, the interface region with the highest electrical conductivity is arranged in an overlap region between the metal cable and the conductive mat.

An interface region can be realized in any number of ways. For example, an interface region can be provided in the form of a metal mesh piece. A higher mesh density is associated with a higher electrical conductivity. A single metal mesh interface is provided, for which the mesh density varies along its length. The higher mesh density is arranged at the current introduction point from the LPS down conductor. A high mesh density can improve the contact area between the metal cable and the conductive mat, thereby improving the conductivity between these parts. A robust electrical connection between the metal mesh pieces, metal cable and carbon mat can be achieved by the application of pressure. Alternatively, the interface regions can be provided in the form of similarly shaped metal mesh pieces that have different mesh densities. These can be arranged next to each other in decreasing order, i.e. with decreasing mesh density in the direction of the carbon-based element, whereby the metal mesh piece with the greatest mesh density is bonded to the metal cable. Adjacent metal mesh pieces can abut at corresponding edges. Alternatively, neighbouring metal mesh pieces can overlap over a significant portion of their areas.

In particularly preferred embodiments of the invention, an interface region comprises a layer of electrically conductive material formed by suspending electrically conductive particles such as chopped carbon fibres and/or metal shavings in a carrier medium such as a resin, an air-drying adhesive, a suitable coating, etc. Alternatively, the interface region can be realized by spraying metallic particles on the surface of a conductive mat. In such embodiments of the stepped conductivity interface, the density of the conductive particles decreases in the direction of the carbon-element. For example, three or more overlapping interface regions can be formed on the conductive mat so that a first interface region comprises the densest suspension of conductive particles, and the final interface region comprises the least dense suspension of conductive particles. The metal band is then bonded to the first interface region.

In such an embodiment, the interface regions can be formed by applying the suspension or particle-carrying medium to a surface of the carbon mat with the aid of a template that has a suitably shaped opening. The template can be held over the carbon mat while the suspension can be painted or sprayed over the opening in the template. To form the next interface region, the template is moved by an appropriate amount that ensures a sufficient overlap between the interface regions, and the process is repeated. The interface regions overlap by at least 20% of the area of an interface region. A relatively large overlap region, in which the contact surface is increased between the two overlapping layers, can ensure a favourable safety margin. Providing a relatively large overlap region can ensure that the lightning current will not "skip" a layer (electric flashover on the surface), and is instead compelled to pass through all layers in sequence.

When a single interface region is used between the metal cable and the carbon mat, the difference in conductivity between either one of these conductive parts and the interface region comprises at most 33% of the difference in conductivity between the metal cable and the carbon mat.

The inventive stepped conductivity interface can comprise any number of interface regions. While a significant improvement can already be expected when using only a relatively small number of interface regions—for example three or four interface regions—the conductivity transition can be made smoother by increasing the number of "steps", i.e. by using a greater number of interface regions.

When two or more interface regions are used, the difference in conductivity between adjacent interface regions comprises at most 33% of the difference in conductivity between the first electrically conductive part and the second electrically conductive part.

BRIEF DESCRIPTION

Some of the embodiments will be described in detail, with references to the following Figures, wherein like designations denote like members, wherein.

DETAILED DESCRIPTION

Figure 1:
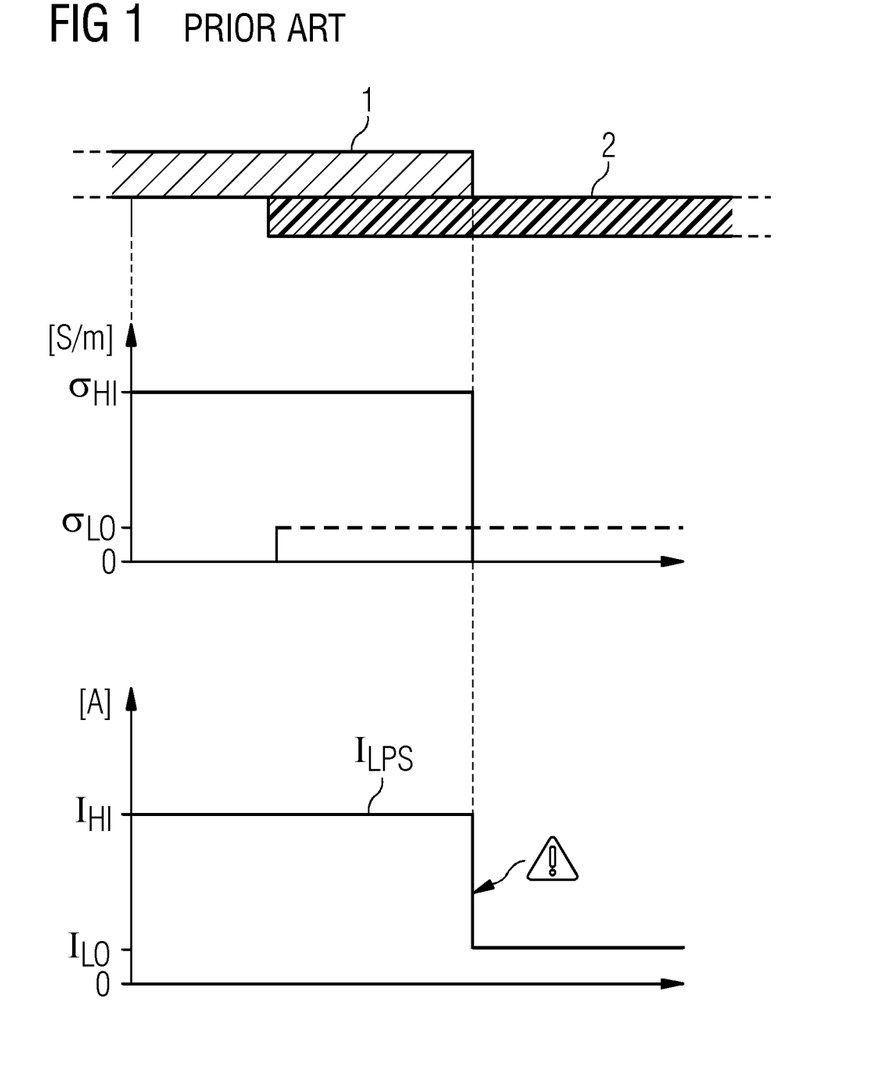
FIG. 1 shows a known interface between a first electrically conductive part and a second electrically conductive part.

FIG. 1 shows a known connection between a first electrically conductive part 1 and a second electrically conductive part 2. The first electrically conductive part 1 may be assumed to be a metal cable 1 that is part of the LPS of a wind turbine rotor blade, and the second electrically conductive part 2 may be assumed to be a carbon mat 2 that is attached to a carbon-based structural element of the rotor blade or to a carbon-based functional sub-system of the rotor blade. The graph in the centre of the diagram shows the electrically conductivities (Y-axis, in S/m) of the metal cable 1 and the conductive mat 2 in the region where these overlap (the X-axis shows distance along the overlap region). The electrical conductivity $\sigma_{HI}$ of the metal cable 1 can be in the order of 1E7 to 5E7 S/m and is therefore significantly higher than the electrical conductivity $\sigma_{LO}$ of the weakly conductive carbon mat 2, which may be in the order of only 5 to 3E4 S/m. The lower part of the diagram shows the electrical current $I_{LPS}$ at this connection in the event of a lightning strike to the rotor blade. The electrical current $I_{LPS}$ through the metal cable 1 will be faced with a sudden barrier at the boundary to the weakly conducting carbon mat 2, with a drop from a first very high current level $I_{HI}$ to a much lower second current level $I_{LO}$, so that arcing may occur from the metal cable 1 to the carbon mat 2, with potentially serious damage as a result.

Figure 2:
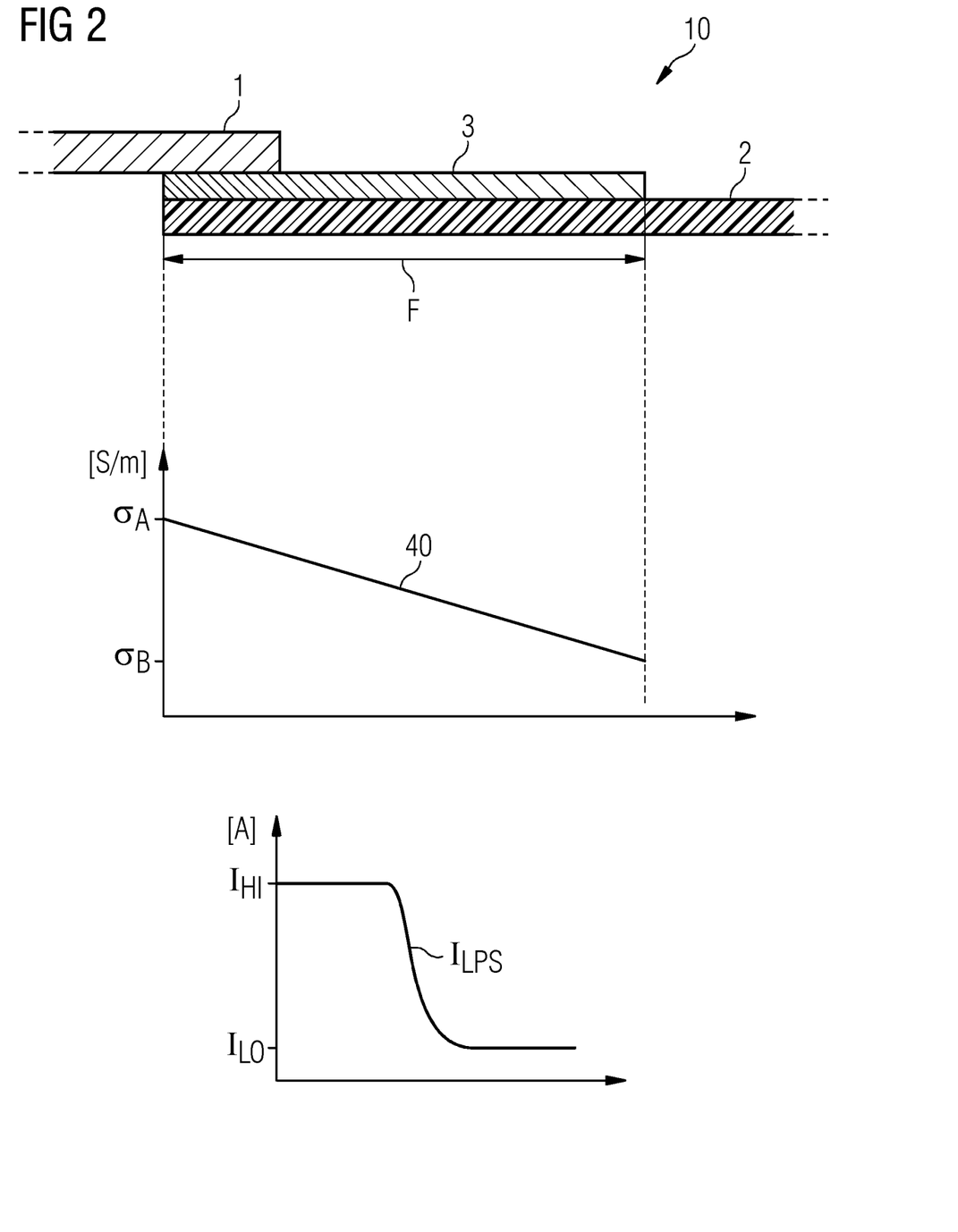
FIG. 2 is a simplified schematic to illustrate the principle of the inventive stepped conductivity interface.

FIG. 2 is a simplified schematic to illustrate the principle of the inventive stepped conductivity interface 10. The diagram shows a first electrically conductive part 1 attached to a second electrically conductive part 2 by means of a transition interface 3 arranged in an interface region F. The first electrically conductive part 1 may be assumed to be a metal cable 1 that connects to the LPS of a wind turbine rotor blade, and the second electrically conductive part 2 may be assumed to be a carbon mat 2 that leads to a carbon element of the rotor blade. The electrical conductivity of the first electrically conductive part 1 is therefore significantly higher than that of the second electrically conductive part 2 as explained in FIG. 1 above. To avoid arcing between the metal cable 1 and carbon mat 2 in the event of a lightning strike to the rotor blade, the transition interface 3 is arranged in the overlap region F. As shown in the middle part of the diagram, the conductivity of the stepped conductivity interface 3 follows a smoothly decreasing curve 40 in the direction of the second electrically conductive part 2, from a high conductivity $\sigma_A$ to a low conductivity $\sigma_B$. In this way, an unfavourable sudden drop in electrical conductivity—as explained in FIG. 1 above—can be avoided, thereby reducing the likelihood of arcing between the first electrically conductive part 1 and the second electrically conductive part 2. The lower part of the diagram shows the electrical current $I_{LPS}$ at this transition in the event of a lightning strike to the rotor blade. The electrical current $I_{LPS}$ through the metal cable 1 is no longer faced by a sudden barrier at the boundary to the weakly conducting carbon mat 2, and the current can decrease smoothly from the very high current level $I_{HI}$ to the much lower second current level $I_{LO}$, with a greatly reduced likelihood of arcing between the metal cable 1 and the carbon mat 2.

Figure 3:
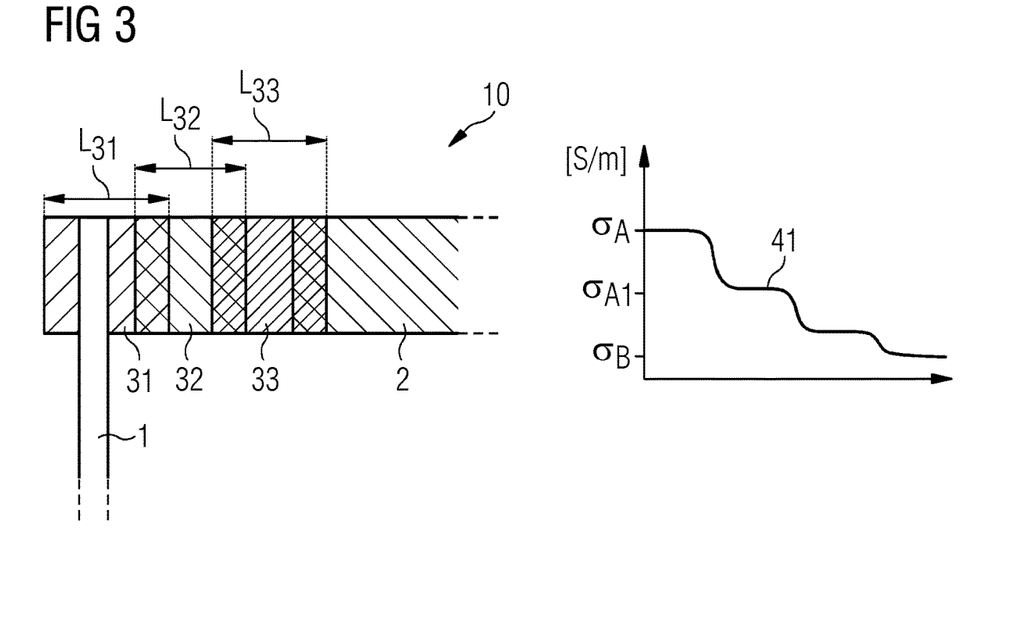
FIG. 3 shows a plan view of an exemplary embodiment of the inventive stepped conductivity interface.

FIG. 3 shows a plan view of an exemplary embodiment of the inventive stepped conductivity arrangement 10. The diagram shows a flat metal cable 1 connected to a conductive mat 2 of carbon fibre, for example a CFRP mat 2. The stepped conductivity arrangement 10 is realized by overlapping layers 31, 32, 33 of a transition interface 3. The overlapping layers 31, 32, 33 have successively decreasing conductivities and are applied onto the conductive mat 2. The intermediate layers prevent the large conductivity discontinuity described in FIG. 1. If only one intermediate layer were used, the difference in conductivity between that single intermediate layer and the carbon mat 2 would be 50% of the conductivity difference between the metal cable 1 and the carbon mat 2, i.e. a "step" is introduced into the conductivity curve. By introducing more intermediate layers, more "steps" can be introduced. The layer 31 with the highest conductivity $\sigma_A$ is electrically connected to the flat metal cable 1. Instead of the ideal decrease in conductivity in the form of a smooth transition 40 as shown in FIG. 2, the conductivity transition 41 in the direction of the CFRP mat 2 may resemble a series of steps, as shown in the lower part of the diagram. The step-wise decreasing conductivity 41 between the metal cable 1 and the conductive mat 2 can effectively avoid arcing in the event of a lightning strike to the rotor blade. The slope of the conductivity 41 can be adjusted by choosing suitable lengths $L_{31}$, $L_{32}$, $L_{33}$ for the layers 31, 32, 33 in the transition region 3. In this exemplary embodiment, only three overlapping layers 31, 32, 33 are shown, but it will be understood that any number of layers can be applied to achieve a desired step-wise conductivity transition 41.

Figure 4:
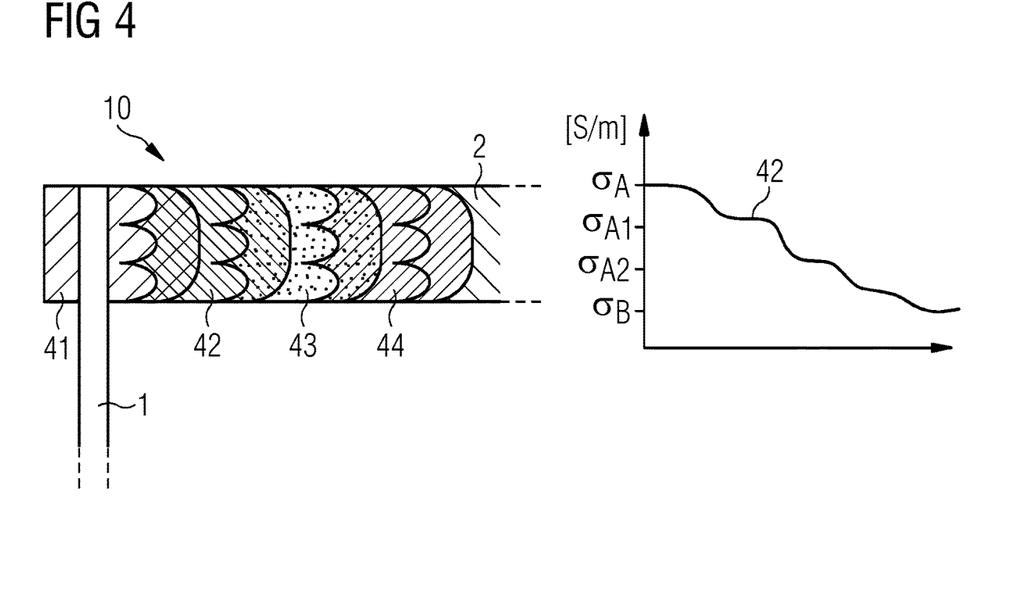
FIG. 4 shows a plan view of a further exemplary embodiment of the inventive stepped conductivity interface.

FIG. 4 shows a plan view of a further exemplary embodiment of the inventive stepped conductivity arrangement 10. Here also, a flat metal cable 1 is connected to a CFRP conductive mat 2. Again, the transition interface 3 is realized by applying overlapping layers 31, 32, 33, 34 with successively decreasing conductivity onto the conductive mat 2. The layer 31 with the highest conductivity $\sigma_A$ is electrically connected to the flat metal cable 1. In this exemplary embodiment, the overlapping layers 31, 32, 33, 34 have a more complex shape than the simple rectangular layers shown in FIG. 3, so that the transition in conductivity from one layer to the next is more gradual, as indicated by the decreasing conductivity curve 42 in the lower part of the diagram. The conductivity transition from metal cable 1 to CFRP mat 2 may therefore resemble a series of rounded steps.

Figure 5:
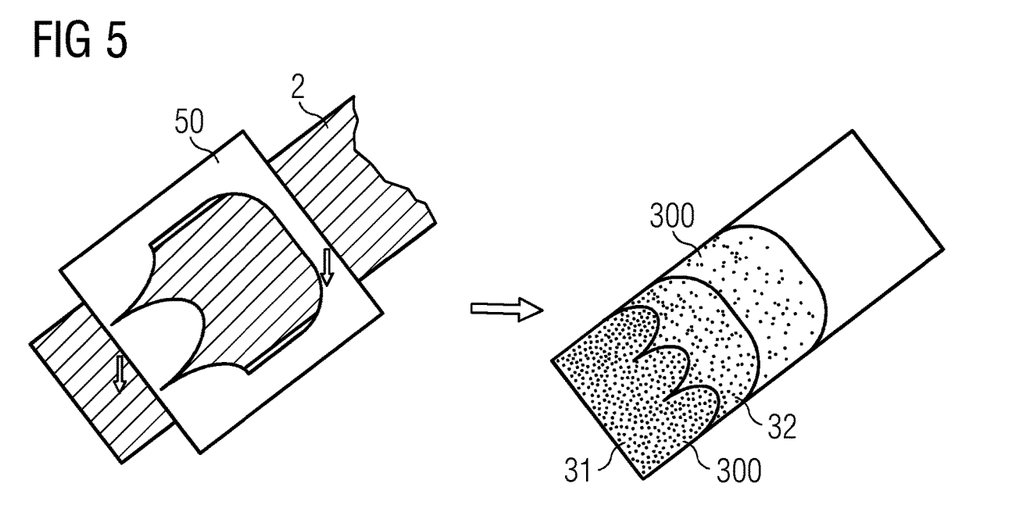
FIG. 5 shows how the stepped conductivity interface of FIG. 4 might be achieved.

FIG. 5 shows how the stepped transition of FIG. 4 might be achieved. Here, a suitably shaped template 50 is held over the conductive mat 2, so that a layer of conductive material may be applied to give that shape. The conductive material may be in liquid form and may be sprayed or painted over the template 50. In this exemplary embodiment, the conductive material comprises conductive particles 300 suspended in a carrier medium, as indicated in the right-hand side of the diagram, which shows a second layer 32 applied over a previous layer 31. After applying a layer and letting it cure or dry, the template 50 can be moved by an appropriate amount before applying the next layer of conductive material so that the next layer overlaps the preceding layer. The densities of the conductive particles 300 in the various layers can decrease with increasing distance from the metal cable.

Figure 6:
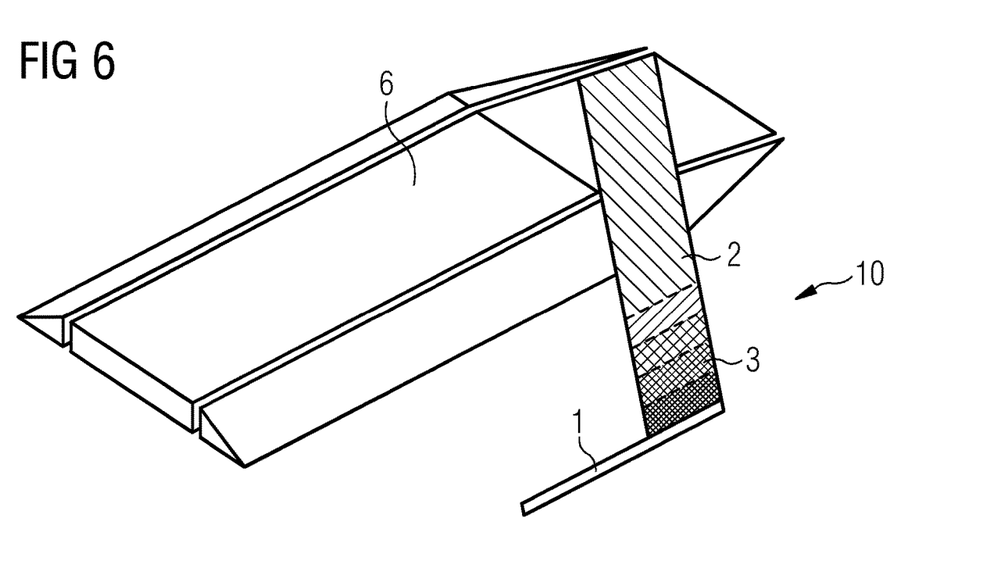
FIG. 6 shows the inventive conductivity interface in relation to a load-carrying element of a wind turbine rotor blade.

FIG. 6 shows the inventive stepped conductivity arrangement 10 in relation to a load-carrying beam 60 made primarily of carbon material. The metal cable 1 is deliberately connected between a down conductor of the rotor blade LPS to the beam 60 by means of a CFRP mat 2, since the beam 60 is electrically conductive, even if only weakly. The diagram also indicates the transition interface 3 between the metal cable 1 and the CFRP mat 2.

Figure 7:
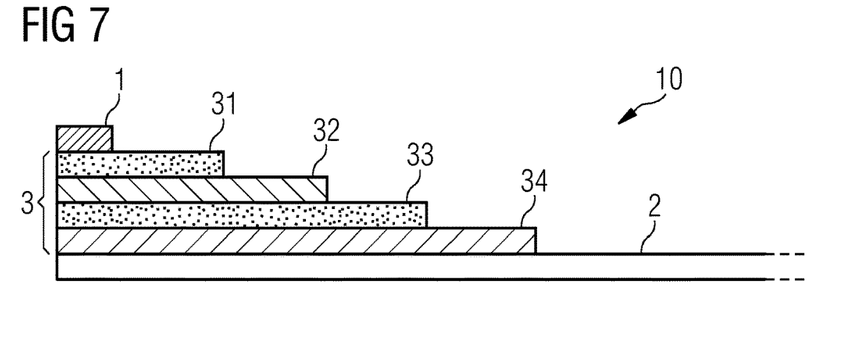
FIG. 7 shows an embodiment with stepped conductivity layers of the inventive stepped conductivity arrangement.
Figure 8:
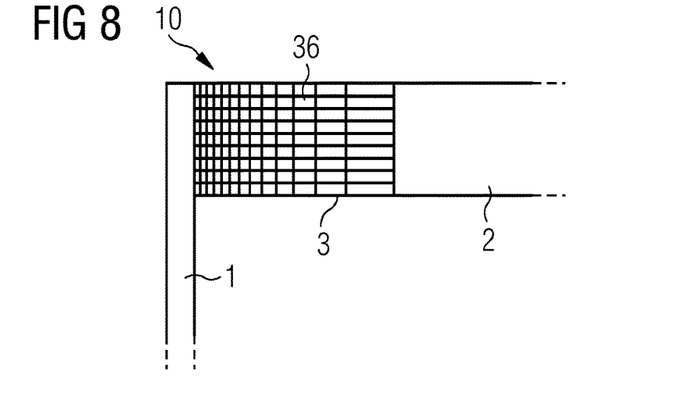
FIG. 8 shows an embodiment with a conductive (metallic) mesh conductivity layer.
Figure 9:
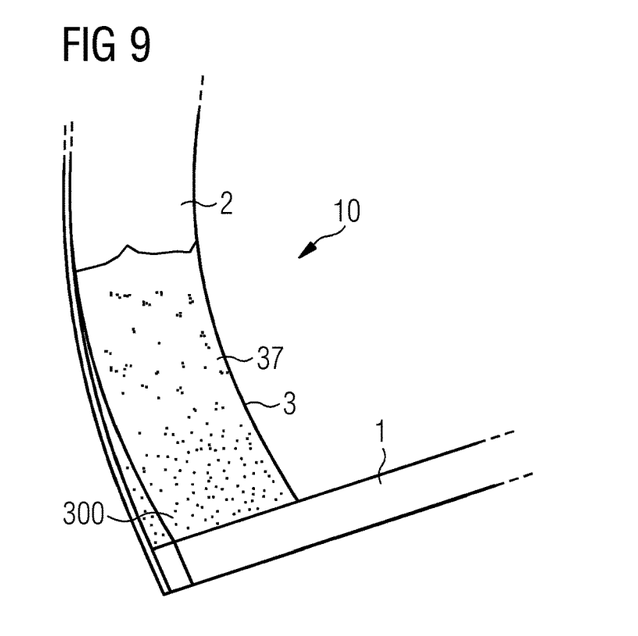
FIG. 9 shows an embodiment with a cured suspension of conductive particles.

FIGS. 7-9 show alternative embodiments of the inventive stepped conductivity arrangement 10. In FIG. 7, the transition interface 3 comprises four layers 31, 32, 33, 34 shown here in cross-section (relative thicknesses are exaggerated). The layers 31, 32, 33, 34 may be made of the same material but with increasing length, so that the conductivity of the "stack" is highest near the metal cable 1 and decreases in the direction of the carbon element at the other end of the carbon mat 2. In FIG. 8, the transition interface 3 comprises a metal mesh 36 shown here in plan view. The metal mesh 36 has a mesh density that is greatest near the metal cable 1, so that the conductivity of the metal mesh 36 is highest near the metal cable 1 and decreases in the direction of the carbon element at the other end of the carbon mat 2. A robust electrical connection between the metal mesh 36, the metal cable 1 and the carbon mat 2 can be achieved by the application of pressure. In FIG. 9, the transition interface 3 comprises a cured suspension 37 of conductive particles 300, shown here in perspective view. The cured suspension 37 has a particle density that is greatest near the metal cable 1, so that the conductivity of the cured suspension 37 is highest near the metal cable 1 and decreases in the direction of the carbon element at the other end of the carbon mat 2. The transition interface 3 can be achieved by applying the viscous suspension to the carbon mat 2, and elevating the carbon mat 2 so that the viscous suspension can flow in the direction of the metal cable 1, so that a region of greatest thickness and correspondingly highest conductivity is formed at the metal cable 1.

Figure 10:
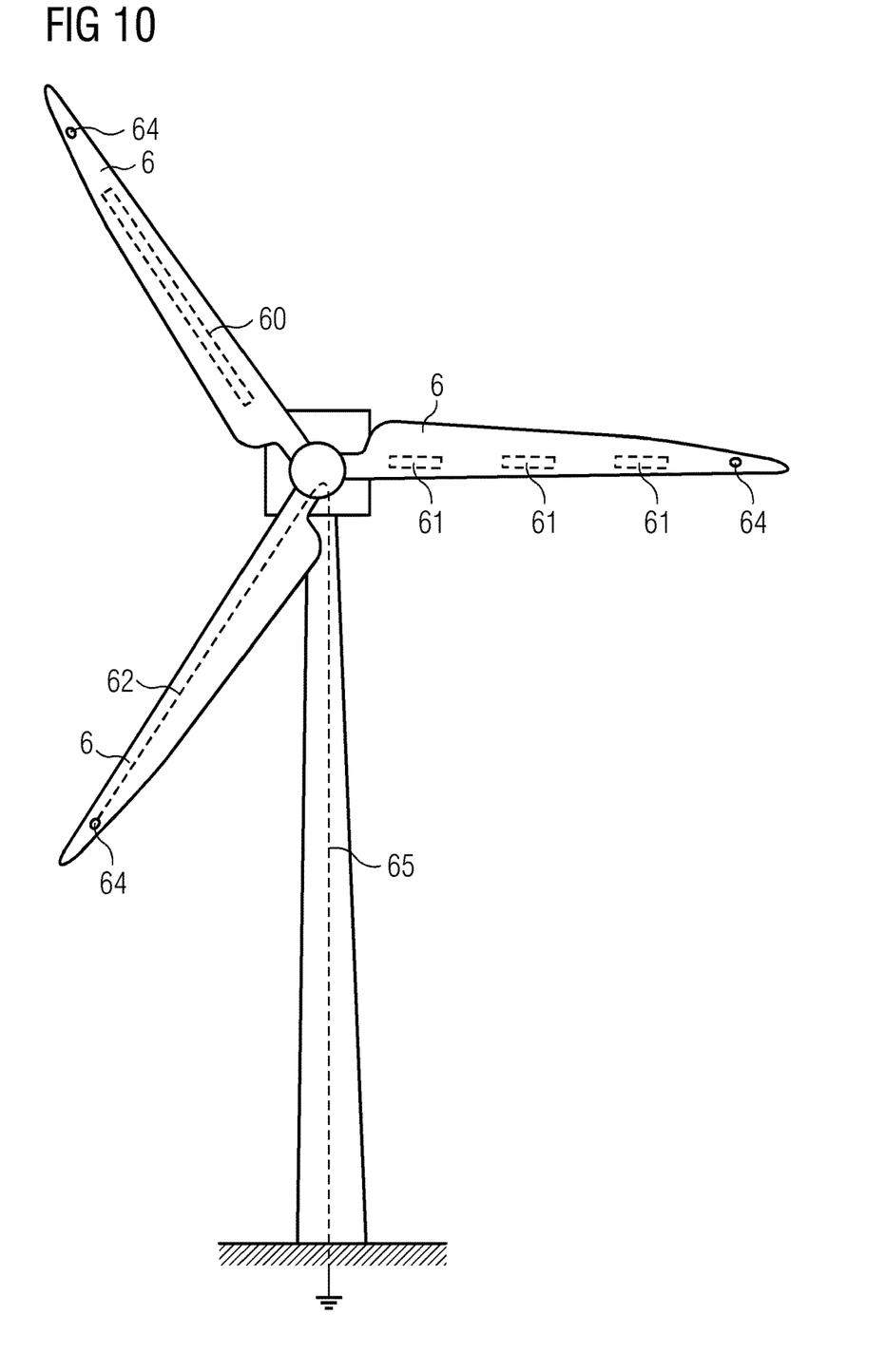
FIG. 10 shows a wind turbine with a number of rotor blades.

FIG. 10 shows a wind turbine with a number of rotor blades 6 mounted to a hub in the usual manner, with a tower supporting a nacelle to which the hub is attached, and a lighting protection system to avoid damage during a lightning strike. Each rotor blade 6 may be assumed to incorporate a down conductor 62 that is connected to a further down conductor 65 in the tower, leading to ground. A lightning strike to a rotor blade is generally received at a tip receptor 64 that is connected to the down conductor, and each rotor blade may be equipped with several such tip receptors 64. The diagram also shows the position of a carbon element such as a load-carrying beam 60 incorporated inside a rotor blade along much of its length, and a heating mat 61 or de-icing mat 61 that may be arranged under the surface of the rotor blade 6 to keep the leading edge free of ice during cold conditions. The inventive wind turbine rotor blade 6 includes one or more embodiments of the inventive stepped conductivity arrangement 10 to connect any such carbon element 60, 61 to the down conductor 62 of the LPS.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stepped conductivity arrangement between a carbon-based element and a down conductor of a wind turbine rotor blade, which stepped conductivity arrangement comprises a transition interface arranged to electrically connect a first electrically conductive part and a second electrically conductive part, wherein the first electrically conductive part extends from the down conductor, the second electrically conductive part extends from the carbon-based element, and wherein the electrical conductivity of the transition interface decreases in a direction of the second electrically conductive part.

2. The stepped conductivity arrangement according to claim 1, wherein the electrical conductivity of the transition interface decreases from a first conductivity to a second conductivity, which second conductivity exceeds the electrical conductivity of the second electrically conductive part.

3. The stepped conductivity arrangement according to claim 1, wherein the transition interface comprises a plurality of transition interface regions having different electrical conductivities, and wherein the electrical conductivities of the interface regions decrease in the direction of the second electrically conductive part.

4. The stepped conductivity arrangement according to claim 3, an interface region with the highest electrical conductivity is arranged in an overlap region between the first electrically conductive part and the second electrically conductive part.

5. The stepped conductivity arrangement according to claim 1, wherein an interface region comprises a layer of electrically conductive material.

6. The stepped conductivity arrangement according to claim 1, wherein a difference in conductivity between adjacent interface regions comprises at most 33% of a difference in conductivity between the first electrically conductive part and the second electrically conductive part.

7. The stepped conductivity arrangement according to claim 1, wherein a difference in conductivity between the second electrically conductive part and an interface region with the lowest electrical conductivity comprises at most 50% of a difference in conductivity between the first electrically conductive part and the second electrically conductive part.

8. The stepped conductivity arrangement according to claim 1, wherein the transition interface comprises a plurality of transition interface regions, wherein an interface region comprises conductive particles in a carrier material, wherein the densities of the conductive particles in the interface regions decrease in the direction of second electrically conductive part.

9. The stepped conductivity arrangement according to claim 1, wherein the second electrically conductive part comprises a conductive mat of carbon fibre, and wherein the transition interface is formed over an entire width of the conductive mat.

10. A wind turbine rotor blade comprising:
a number of carbon-based elements incorporated in the rotor blade;
a down conductor of a lightning protection system; and
a stepped conductivity arrangement between the down conductor and the carbon-based elements;
whererin the stepped conductivity arrangement includes a transition interface arranged to electrically connect a first electrically conductive part and a second electrically conductive part, wherein the first electrically conductive part extends from the down conductor and the second electrically conductive part extends from at least one carbon-based element of the number of carbon-based elements, and wherein the electrical conductivity of the transition interface decreases in a direction of the second electrically conductive part.

11. The wind turbine rotor blade according to claim 10, wherein one or more of the number of carbon-based elements comprises a load-carrying structural element.

12. The wind turbine rotor blade according to claim 10, wherein one or more of the number of carbon-based elements comprises a functional element.

13. A method of providing a stepped conductivity arrangement between a carbon-based element and a down conductor of a wind turbine rotor blade, which method comprises the steps of
providing a first electrically conductive part extending from the down conductor;
providing a second electrically conductive part extending from the carbon-based element;
forming a transition interface between the first electrically conductive part and the second electrically conductive part, wherein the electrical conductivity of the transition interface decreases in a direction of the second electrically conductive part.

14. The method according to claim 13, wherein the transition interface is formed by applying a fluid conductive material to a surface of the second electrically conductive part with the aid of a template.

15. The method according to claim 13, wherein the transition interface is formed by arranging a metal mesh on the second electrically conductive part and applying graded pressure to bond the metal mesh to the second electrically conductive part.

* * * * *